T. HORI.
AUTOMOBILE SIGNAL.
APPLICATION FILED DEC. 3, 1915.
1,204,020.
Patented Nov. 7, 1916.
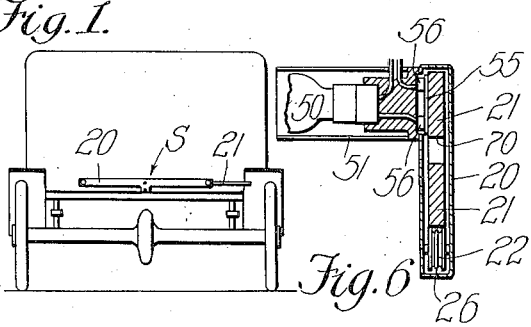
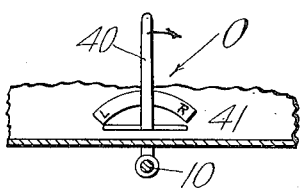
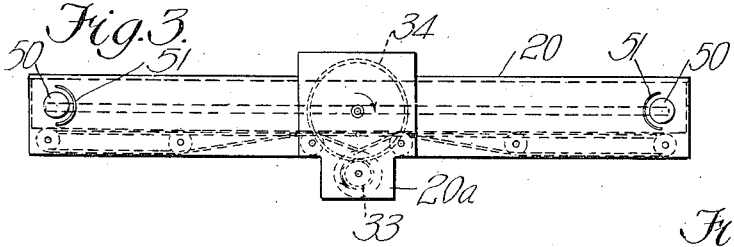
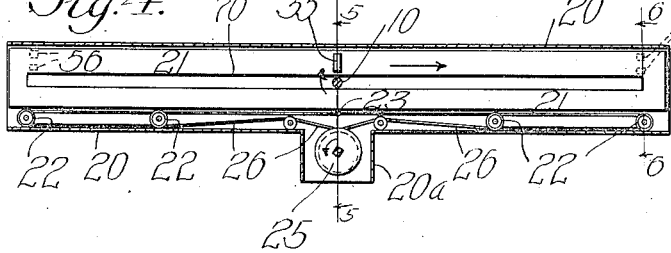
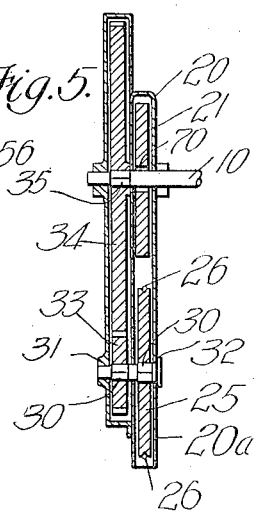
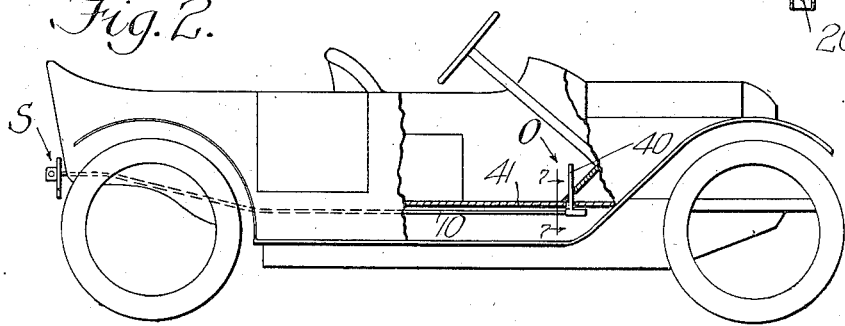
Witness
Elwood H. Batcheller
Inventor
Tatsuo Hori,
by James T. Batcheller
his Attorney.

UNITED STATES PATENT OFFICE.

TATSUO HORI, OF INGLEWOOD, CALIFORNIA.

AUTOMOBILE-SIGNAL.

1,204,020.

Specification of Letters Patent.

Patented Nov. 7, 1916.

Application filed December 3, 1915. Serial No. 64,882.

*To all whom it may concern:*

Be it known that I, TATSUO HORI, a Japanese subject, residing at Inglewood, in the county of Los Angeles, State of California, have invented new and useful Improvements in Automobile-Signals, of which the following is a specification.

This invention relates to signal devices for automobiles or other vehicles; and it is a primary object of this invention to provide a simple, efficient and inexpensive means for indicating the direction in which an automobile or the like is about to turn; and to provide a signal which is easily and simply operated, and one which can be quickly and inexpensively installed upon any automobile.

The features of my invention, and the construction and operation of a preferred form thereof, are explained in the following specification, reference being had to the accompanying drawings, in which I have show a preferred form of device embodying my invention.

In these drawings Figure 1 is a rear view of an automobile equipped with my signal, Fig. 2 is a side elevation of the same, parts being broken away for illustration, Fig. 3 is an enlarged rear view of signal mechanism itself, Fig. 4 is a longitudinal section of the signal mechanism, Fig. 5 is an enlarged section taken as indicated by line 5—5 on Fig. 4. Fig. 6 is an enlarged section taken as indicated by line 6—6 on Fig. 4, and Fig. 7 is an enlarged detail section taken as indicated by line 7—7 on Fig. 2.

In the drawings my signal mechanism is denoted generally by the letter S and the operating mechanism therefor denoted generally by the letter O. The signal mechanism itself is placed preferably at the rear end of an automobile (although it will be seen that it can be as well placed at the front) while the operating mechanism may be placed in the convenient position, as shown, to be actuated by the driver's foot. The signal mechanism and the operating mechanism are connected by a suitable shaft 10; and a flexible shaft may be used for this purpose.

The signal mechanism S includes an elongate box or casing 20 open at its opposite ends; and a slider 21 is adapted to slide longitudinally in this box or casing, so that, by movement in either of the two opposite directions, either end of the slider may be projected beyond the end of the casing and thus exposed to view. This is indicated in Fig. 1. The slider 21 may be mounted upon suitable rollers or sheaves 22 so that it will move easily in a longitudinal direction. In a part 20ª of the casing I mount a pulley 25 around which a cord 26 is wound; and this cord 26 extends over the rollers 22 out to the outer ends of the box or casing 20 and thence back to be fastened at 23 to the center of the slider 21. The arrangement is such that when the pulley 25 is rotated in the direction indicated by the arrow, then the slider will be thrown out toward the right in the direction indicated by the arrow in Fig. 4; and will be thrown out toward the left in Fig. 4 by reverse rotation of the pulley 25.

Pulley 25 is mounted upon a squared shaft 30, which revolves in bearings 31 and 32 at its opposite ends; and a small pinion 33 is also carried upon this squared shaft. The pinion 33 meshes with a large gear 34 mounted upon the squared end 35 of shaft 10. The ratio of gears 33 and 34 is such that a movement of shaft 10 through a fraction of a revolution will throw the slider 21 clear out to its limiting position in one direction or the other.

The operating mechanism O is preferably located in position to be conveniently operated by the driver's foot; and embodies an arm 40 mounted upon the shaft 10 and projecting up through the floor board 41 of the automobile. The arm 40 will normally stand in upright position. Movement of the arm toward the right in Fig. 7 will revolve the shaft 10 in the direction indicated in Figs. 3 and 4 and will cause the revolution of the pulley 25 in the direction indicated in Fig. 4. This will cause the slider 21 to move out to the right, so that the right hand end of the slider is fully exposed beyond the end of the casing 20 as illustrated in Fig. 1. An opposite movement of the arm 40 will cause opposite movement of the parts described, and will move the left hand end of the slider 21 out beyond the left hand end of the casing 20, exposing that end to view. Exposure of the slider 21 is the means of signal. When the right hand end of the slider is moved out and exposed, the signal indicates that the automobile is about to turn to the right; when the left hand end of the slider moves out and is exposed, the signal indicates that the automobile is about to turn to the left. The driver moves the slider by merely moving the arm 40; and it is to be noted that the whole apparatus is very easily operated, as the slider 21 is mounted on the rollers 22 and as there is no long train of mechanism to be actuated from the arm 40.

Now, the exterior of the casing 20 may be painted in any desired color; and the slider 21 may also be painted in any desired color. In practice I may paint the casing 20 and the slider 21 red, so as to make a very marked distinction between the two. I may also illuminate the exposed end of the slider in any desired manner; as by small electric lights 50 placed upon the opposite ends of the casing and having reflectors 51 behind them, which reflectors will direct the light along the exposed end of the slider. The lights 50 may be illuminated continuously; or they may be illuminated only when the slider slides to one end or the other of the casing. The slider may carry a central contact member 55; and at each end of the casing there may be contacts 56 which are connected with the lights 50 in such manner that the closure of electrical circuits between the two contacts 56 will cause the closure of the circuit to the light. When the slider moves in either direction to its limited position the contact member 55 will engage the two members 56 at that end; and electrical connection will thereby be established between the two contact members 56; and this establishment of the electrical connection may be easily used to establish circuits to the lamp 50, as will be understood from Fig. 6. The lamp 50 may throw a red light; so that, in addition to the red slider being exposed at one end of the casing, a red light is also lighted at that end. Thus, I provide a signal which is as effective at night time as in the day time.

It will be understood that changes in construction may be made without departing from my invention. For instance, the exact size, dimensions, proportions and locations of the various parts are not of vital consequence so far as the invention is concerned. For instance, I place the gear 34 in such a position that the shaft 10 passes through the center of the casing or box 20; and this necessitates a slot 70 in the slider 21. The gear 34 can be placed at any position around the pinion 33; but for appearance sake I prefer to place it centrally and symmetrically with relation to the other parts.

Having described a preferred form of my invention, I claim:

1. An automobile signal, embodying an elongate casing open at opposite ends, an elongate slider movable longitudinally in either direction in the casing, rollers on said casing to support said slider and allow it to move freely, and means to move the slider so that either of its opposite ends may be projected into view beyond the ends of the casing, said means embodying an operating shaft, an arm mounted on said shaft adapted for manual actuation, a pulley, a cord wound around said pulley and attached to the slider, and gear connection between the operating shaft and the pulley, the slider and casing being of such relative length that the slider is hidden within the casing when in its normal medial position.

2. An automobile signal, embodying an elongate casing open at opposite ends, an elongate slider movable longitudinally in either direction in the casing, rollers in said casing to support said slider and allow it to move freely, a pulley mounted in said casing below the slider, a cord wound around the pulley extending outwardly to the ends of the casing over said rollers and back to the center of the slider and there secured, an operating shaft mounted in bearings in said casing, and gear connection between the operating shaft and the pulley, the slider and casing being of such relative length that the slider is hidden within the casing when in its normal medial position.

In witness that I claim the foregoing I have hereunto subscribed my name this 23d day of November, 1915.

T. HORI.

Witnesses:
   JAMES T. BARKELEW,
   ELWOOD H. BARKELEW.